Sept. 12, 1961    E. P. WARNKEN    2,999,272
MACHINE FOR FORMING PRE-STRESSED HOLLOW ARTICLES
Original Filed Oct. 9, 1957    2 Sheets-Sheet 1
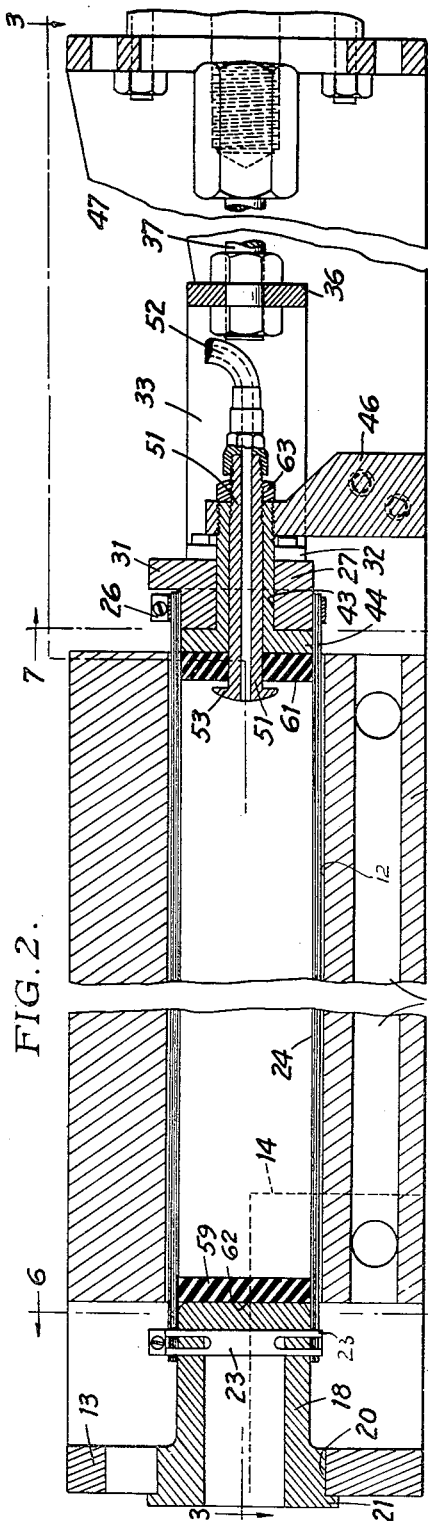
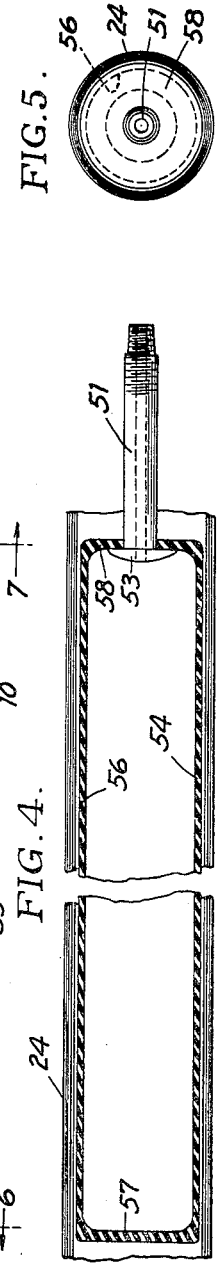
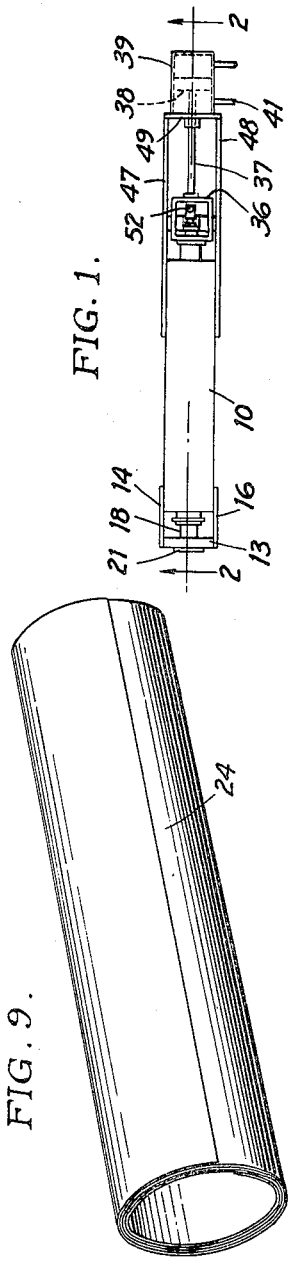
INVENTOR.
ELMER P. WARNKEN
BY Zugelter and Zugelter
ATTORNEYS Sept. 12, 1961 E. P. WARNKEN 2,999,272
MACHINE FOR FORMING PRE-STRESSED HOLLOW ARTICLES
Original Filed Oct. 9, 1957 2 Sheets-Sheet 2

INVENTOR.
ELMER P. WARNKEN
BY Zugelter and Zugelter
ATTORNEYS

United States Patent Office 2,999,272
Patented Sept. 12, 1961

2,999,272
MACHINE FOR FORMING PRE-STRESSED
HOLLOW ARTICLES
Elmer P. Warnken, Cincinnati, Ohio, assignor, by mesne assignments, to Studebaker-Packard Corporation, South Bend, Ind., a corporation of Michigan
Original application Oct. 9, 1957, Ser. No. 689,144. Divided and this application May 9, 1958, Ser. No. 734,238
2 Claims. (Cl. 18—19)

This invention relates to prestressed hollow articles and to a method and machine for forming prestressed hollow articles. This is a division of my co-pending application Serial No. 689,144 filed October 9, 1957.

Laminated, resin-impregnated articles are strengthened when they are molded with the laminations thereof stressed in tension. An object of this invention is to provide a method and device for molding a hollow article, such as a tube, while the walls thereof are stressed in tension.

When walls of a tubular article are stressed in tension lengthwise thereof, there is a tendency for the walls of the article to bow inwardly. A further object of this invention is to provide a method and device for stressing the walls of a tubular article lengthwise and for subjecting the interior of the article to pressure to prevent inward collapse or bowing of the walls thereof and to urge the walls against mold walls during molding properly to mold the outer face of the tubular article.

A further object of this invention is to provide a device of this type in which a flexible bladder is positioned inside a mold in spaced relation to the wall thereof and in which means are provided for gripping ends of tubular resin-impregnated laminations received in the space between the bladder and the wall of the mold and stressing the laminations lengthwise, while the bladder is inflated or distended by hydraulic fluid or the like which is injected into the bladder during molding to stretch the walls of the bladder so that the bladder holds the resin-impregnated laminations in engagement with the interior wall of the mold.

The above and other objects and features of the invention will in part be apparent and will in part be obvious to those skilled in the art to which this invention pertains, from the following detailed description, and the drawing, in which:

FIGURE 1 is a somewhat schematic plan view showing a machine constructed in accordance with an embodiment of this invention;

FIG. 2 is an enlarged view in section taken on the line 2—2 in FIG. 1 with the bladder removed;

FIG. 4 is a view in lengthwise section of the bladder of the device removed therefrom, the bladder being shown in association with a preformed laminated article or preform;

FIG. 5 is a view in end elevation of the bladder and preform illustrated in FIG. 4;

FIG. 9 is a perspective view showing a preformed tubular article or preform prior to molding.

In the following detailed description, and the drawings, like reference characters indicate like parts.

Figure 3:
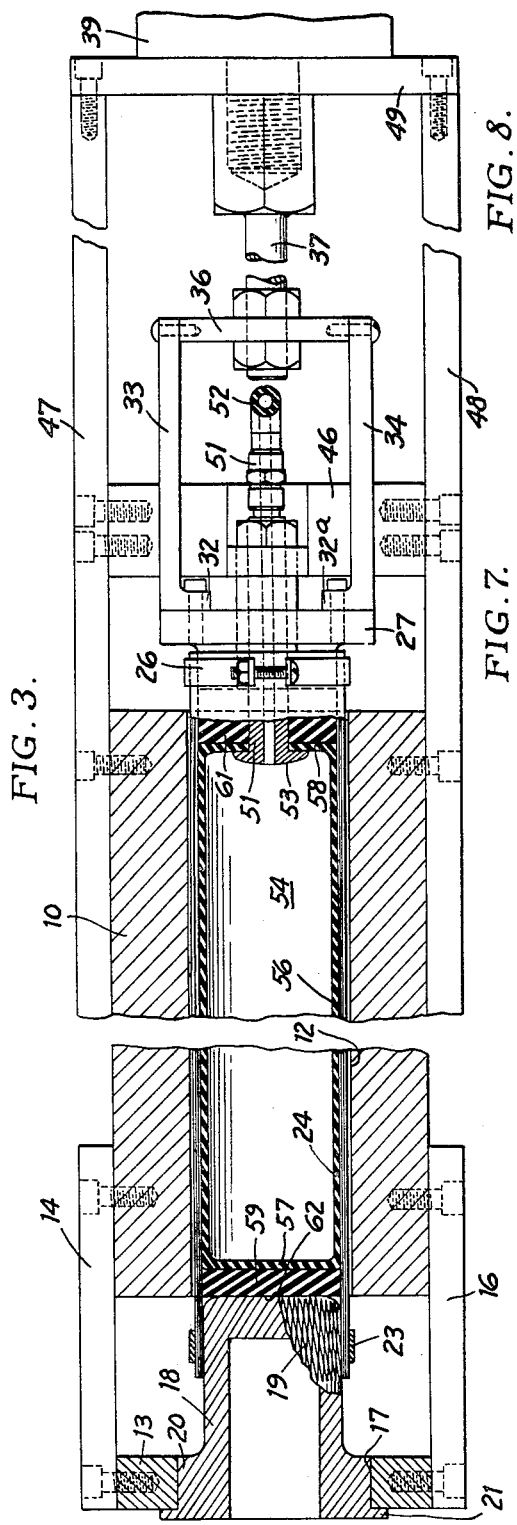
FIG. 3 is a view in section taken on the line 3—3 in FIG. 2 with the bladder in place and in molding position prior to molding.

In FIG. 1 is shown a molding machine which includes a mold body 10. The body 10 has a lengthwise bore 12 (FIGS. 2 and 3). A bracket 13 is attached to the mold body 10 by links 14 and 16. The bracket 13 has a central opening 17 through which a clamp-supporting member 18 extends. As shown in FIG. 3, one end of the clamp support 18 is cylindrical and is provided with a knurled surface 19. The other end of the clamp support is provided with a first flange 20 which fits in the opening 17 of the bracket 13, and a second flange 21 which engages the bracket 13 to limit movement of the clamp support 18 toward the main mold body. As shown in FIGS. 2 and 3, the knurled surface 19 of the clamp support 18 co-operates with a split-ring clamp 23 to engage and grip one end of a preform cylinder 24.

The preform cylinder 24 may be formed of appropriate resin-impregnated laminations which are wound to a hollow cylindrical form as indicated in FIG. 9. Preferably I construct my preform cylinder from a flat sheet of glass fibre cloth having a substantially uniform weave. The glass fibre cloth is impregnated with a suitable resin which preferably is a heat-setting resin and can be of the phenol-formaldehyde type. A rectangular section is cut from the sheet. Preferably the section is cut on the bias, i.e., the lengthwise dimension of the section extends at an angle of approximately 45 degrees to the warp and weft of the glass fibre cloth. The sheet of resin-impregnated glass fibre cloth is wound upon a mandrel (not shown) to the hollow, cylindrical shape shown in FIG. 9. Before winding, the sheet is heated sufficiently to soften the resin so that it can be formed. The preform can have several convolutions. For some applications the preform can have four convolutions. For other applications, it may have other numbers of convolutions and the number of convolutions or laminations is dictated by the wall thickness and strength desired in the finished article.

Figure 8:
FIG. 8 is a view partly in side elevation and partly in section showing a prestress sleeve which forms a portion of the device.
Figure 7:
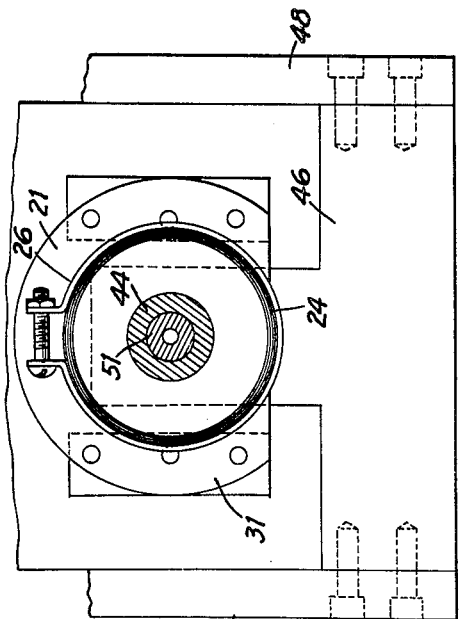
FIG. 7 is a view in section taken on the line 7—7 in FIG. 2.
Figure 6:
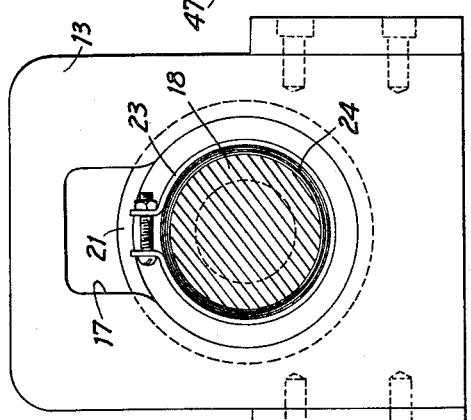
FIG. 6 is a view in section taken on the line 6—6 in FIG. 2.

As shown most clearly in FIGS. 2 and 3, the preform is longer than the mold body 10 and, when the preform is mounted in the mold body, end portions of the preform extend beyond ends of the mold body. The preform has an outer diameter which is smaller than the inner diameter of the bore 12 of the mold body so that the walls of the preform are stretched during molding. The diameter of the preform, for best results, can be 1% to 5% smaller than the internal diameter, and the diameter of the preform is such that, on expansion thereof into engagement with the inner wall of the mold during molding, the fibres thereof are stretched but without substantial rupturing of fibres. The left hand end of the preform is held by the clamp 23 and clamp support 18, as already indicated. The right hand end of the preform is held by a split-ring clamp 26 and a prestress sleeve 27. Details of construction of the prestress sleeve are shown in FIG. 8. As there indicated, the prestress sleeve has a cylindrical knurled portion 29 which co-operates with the clamp 26 to hold the right hand end of the preform 24. In addition, the sleeve 27 is provided with an outwardly extending flange 31. The flange 31 is attached to flanges 32 and 32a on rigid links 33 and 34, respectively. The links 33 and 34, in turn, are attached to ends of a transverse bar 36. The transverse bar 36 is attached to a connecting rod 37. The connecting rod 37, as indicated in FIG. 1, is connected to a piston 38 which reciprocates inside a cylinder 39, so that, when hydraulic fluid or the like is injected into the cylinder 39 through a conduit 41, the connecting rod 37 is advanced to the right as shown in FIGS. 1, 2, and 3, to move the transverse bar 36 and the sleeve 27 to the right as shown in FIGS. 1, 2, and 3, in preform stressing direction.

The prestress sleeve 27 is provided with a central bore 43 in which the shank of a fitting 44 is received. The prestress sleeve 27 is mounted to slide along the shank of the fitting 44 during stressing and molding of the preform. An end portion of the shank of the fitting 44 is threaded in an opening in a base block 46. The block 46 is attached to and spans rigid link members 47 and 48. One end of each of the rigid link members 47 and 48 is attached to a plate 49 on which the cylinder 39 is mounted. The other ends of the link members 47 and 48 are rigidly attached to sides of the mold body 10 so that the plate 49, the block 46 and the fitting 44 are rigidly held in place.

The fitting 44 has a central bore in which the shank of a tubular fluid fitting 51 is received. One end of the tubular fitting 51 is connected to a fluid pressure line 52. The pressure line may be connected to a suitable source of fluid under pressure (not shown). The other end of the fluid fitting 51 has a head 53 which extends inside a hollow bladder 54 of flexible resilient material such as rubber, or the like.

The bladder 54, as shown in FIG. 4, has a main cylindrical wall 56 which may have a normal diameter which is a little less than the inner diameter of the preform 24, so that the preform may slide into the bore of the mold body and around the bladder. End walls 57 and 58 of the bladder extend transversely of the axis of the bladder. As shown in FIG. 3, spacers 59 and 61 of relatively hard rubber, or the like abut the end walls 57 and 58, respectively, of the bladder. Outer faces of the spacers are flush with the ends of the mold body 10. The spacer 59 is a disc and is held in position engaging the left hand end wall of the bladder (see FIG. 3) by an end face 62 of the clamp supporting member 18. The spacer 61 is annular and fits on the shank of the fluid fitting 51 in engagement with the head of the fitting 44. The end wall 58 of the bladder is provided with an opening through which the shank of the fluid fitting 51 extends. The end wall 58 of the bladder and the spacer 61 are clamped between the head 53 of the fluid fitting and the head of fitting 44 when a nut 63 is drawn up on the shank of the fluid fitting 51.

When a preform is to be molded, one end of the preform is mounted on the clamp supporting member 18 and clamped thereto by the clamp 23. The preform is then loaded into the mold surrounding the bladder with the spacers in position thereinside and the other end of the preform is clamped to the prestress sleeve 27 by the clamp 26. The mold body 10 is heated to a molding temperature 265°–300° F. by injecting a heated fluid, such as superheated steam, through bores 65 in the mold body or by any other suitable means. Hydraulic fluid is injected into the cylinder 39 through conduit 41 to cause the prestress sleeve 27 to be drawn to the right (as shown in FIGS. 1, 2, and 3) to stress the laminations of the preform in tension lengthwise thereof. A tension stress of about 20,000 pounds per square inch on the laminations of the preform based on the anticipated finished thickness has been found satisfactory with phenolformaldehyde impregnated glass fibre laminations. At the same time, hydraulic fluid is pumped through the fluid pressure line 52 to inflate and distend the bladder to urge the walls of the preform against the wall of the bore of the mold body. A pressure of 300 pounds per square inch has been found satisfactory. Higher pressure of 300 to 1000 pounds per square inch also give good results. The preform can be molded inside the bore for 15–30 minutes with sufficient internal pressure inside the bladder to stretch the wall of the preform until the preform engages the wall of the bore of the mold body. Then the pressure is released on the bladder and in cylinder 39, the clamps 26 and 23 are released, and the molded tube is removed from the mold.

In the completed article, the glass fibre material is stressed in tension and the resin is stressed in compression to hold the glass fibre material in tension.

The article and the method and machine for molding articles described above and illustrated in the drawings, are subject to modification without departing from the spirit and scope of the appended claims.

Having described my invention, what I claim as new, and desire to protect by Letters Patent is:

1. A machine for forming a prestressed hollow, tubular article which comprises an elongated mold body having an elongated mold bore therein, an elongated bladder inside the mold body, the outer diameter of the bladder being less than the interior diameter of the mold bore to form an annular space between the bladder and the mold bore for receiving a tubular, laminated, resin-impregnated preform with end portions of the preform projecting from opposite ends of the mold bore, clamp means for engaging the opposite end portions of the preform throughout the circumference thereof, means for moving at least one of the clamp means in a direction axially of the mold bore and of the preform to stress the walls of the preform in tension throughout the circumference thereof, means for injecting hydraulic fluid into the bladder to cause the wall of the bladder to engage the inner wall of the preform and urge the wall of the preform into engagement with the wall of the mold bore, and means for heating the mold body to set the resin of the preform while the preform is prestressed both lengthwise and circumferentially.

2. A machine for forming a prestressed hollow, tubular article which comprises an elongated mold body having an elongated mold bore therein, an elongated mold bladder mounted inside the mold body, the outer diameter of the bladder normally being less than the interior diameter of the mold bore to form an annular space between the bladder and the mold bore for receiving a tubular, laminated, resin-impregnated preform with end portions of the preform projecting from opposite ends of the mold bore, ends of the bladder terminating inside the mold bore, clamp means for engaging the opposite end portions of the preform throughout the circumference thereof outboard of the ends of the mold body, means for moving at least one of the clamp means in a direction axially of the mold bore and of the preform to stress the walls of the preform in tension throughout the circumference thereof, plug members in the ends of the mold bore, said plug members being engageable with the clamp members for holding the ends of the bladder inside the mold bore inboard of the clamp members, a conduit through one of the plug members for injecting hydraulic fluid into the bladder to cause the wall of the bladder to engage the inner wall of the preform and urge the wall of the preform into engagement with the wall of the mold bore, and means for heating the mold body to set the resin of the preform while the preform is prestressed both lengthwise and circumferentially.

References Cited in the file of this patent

UNITED STATES PATENTS

| | | |
|---|---|---|
| 2,153,741 | Cobi | Apr. 11, 1939 |
| 2,456,513 | Johnson | Dec. 14, 1948 |
| 2,723,426 | Pelley | Nov. 15, 1955 |
| 2,759,217 | Peterson | Aug. 21, 1956 |
| 2,763,029 | Tuloss | Sept. 18, 1956 |
| 2,813,573 | Roberts | Nov. 19, 1957 |
| 2,856,634 | Ames | Oct. 21, 1958 |